(12) United States Patent
Beaurepaire et al.

(10) Patent No.: US 10,296,516 B2
(45) Date of Patent: May 21, 2019

(54) METHOD AND APPARATUS FOR NAVIGATION USING MULTIPLE SYNCHRONIZED MOBILE DEVICES

(71) Applicant: HERE GLOBAL B.V., Eindhoven (NL)

(72) Inventors: Jerome Beaurepaire, Berlin (DE); Maguy Jamain, Berlin (DE); Marko Tapio Tuukkanen, Schlenzer (DE); Mirko Konig, Berlin (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 13/898,034

(22) Filed: May 20, 2013

(65) Prior Publication Data

US 2014/0164322 A1    Jun. 12, 2014

Related U.S. Application Data

(63) Continuation-in-part of application No. 13/476,557, filed on May 21, 2012.

(51) Int. Cl.
*G06F 3/00* (2006.01)
*G06F 16/27* (2019.01)
(Continued)

(52) U.S. Cl.
CPC ......... *G06F 16/27* (2019.01); *G01C 21/3438* (2013.01); *G01C 21/36* (2013.01);
(Continued)

(58) Field of Classification Search
CPC ........... G06F 2203/04806; G06F 3/013; G06F 3/04845; G06F 3/0488; G06F 3/04883;
(Continued)

(56) References Cited

U.S. PATENT DOCUMENTS 6,360,168 B1 * 3/2002 Shimabara ......... G01C 21/3638
340/990
6,816,782 B1 * 11/2004 Walters et al. ............... 701/426
(Continued)

FOREIGN PATENT DOCUMENTS

| EP | 2290322 A1 | 3/2011 |
| JP | 2011033445 A | 2/2011 |
| WO | 2008077058 A1 | 6/2008 |

OTHER PUBLICATIONS

International Search Report for corresponding Application No. PCT/EP2013/060345, dated Aug. 28, 2013, pp. 4.
(Continued)

*Primary Examiner* — Tadesse Hailu
*Assistant Examiner* — Andrew Chung
(74) *Attorney, Agent, or Firm* — Ditthavong & Steiner, P.C.

(57) ABSTRACT

An approach is provided for providing different views of an ongoing application across multiple devices in a synchronized manner. A synchronization platform determines that at least one device and at least one other device are executing at least one common application. The synchronization platform causes, at least in part, a synchronization of data for the at least one common application among the at least one device and the at least one other device. In addition, the synchronization platform determines one or more respective user interface views for presenting the data on the at least one device, the at least one other device, or a combination thereof, wherein the one or more respective user interface views are presented via the at least one common application.

20 Claims, 9 Drawing Sheets

(51) Int. Cl.
  *G06F 17/30* (2006.01)
  *G06F 3/048* (2013.01)
  *G01C 21/34* (2006.01)
  *G01C 21/36* (2006.01)

(52) U.S. Cl.
  CPC ......... *G01C 21/3688* (2013.01); *G06F 3/048* (2013.01); *G06F 17/30575* (2013.01)

(58) Field of Classification Search
  CPC ........ G06F 13/00; G06F 3/048; G06F 3/0482; G06F 3/1201; G06F 9/5027; G06F 17/30905; G06F 17/50; G06F 3/0304; G06F 3/0481; G06F 3/04815
  USPC .......................................................... 715/744
  See application file for complete search history.

(56) References Cited

U.S. PATENT DOCUMENTS

| | | | | |
|---|---|---|---|---|
| 7,739,038 | B2* | 6/2010 | Coch et al. | 701/468 |
| 8,155,873 | B2* | 4/2012 | Nakao | G01C 21/28 370/206 |
| 8,170,480 | B1 | 5/2012 | Kammer et al. | |
| 8,200,847 | B2* | 6/2012 | LeBeau | G01C 21/265 709/249 |
| 8,340,726 | B1* | 12/2012 | Fujisaki | H04M 19/04 345/168 |
| 8,458,597 | B1* | 6/2013 | Tijssen | H04N 21/4788 715/748 |
| 8,970,647 | B2* | 3/2015 | Alsina | G06F 9/4445 715/766 |
| 2005/0246639 | A1* | 11/2005 | Zellner | G06Q 10/00 715/708 |
| 2007/0288164 | A1* | 12/2007 | Gordon et al. | 701/213 |
| 2008/0046174 | A1* | 2/2008 | Johnson | 701/209 |
| 2008/0077882 | A1* | 3/2008 | Kramer | B60K 35/00 715/810 |
| 2008/0092041 | A1* | 4/2008 | Mathews | G06F 8/34 715/700 |
| 2008/0097970 | A1* | 4/2008 | Olstad | G06F 17/30796 |
| 2008/0104227 | A1 | 5/2008 | Birnie et al. | |
| 2008/0134088 | A1* | 6/2008 | Tse | G06F 17/30241 715/810 |
| 2008/0229202 | A1* | 9/2008 | Fang | H04N 5/76 715/716 |
| 2008/0266142 | A1* | 10/2008 | Sula | G01C 21/3647 340/995.17 |
| 2009/0040186 | A1* | 2/2009 | Esenther | 345/173 |
| 2009/0113288 | A1* | 4/2009 | Thampy et al. | 715/234 |
| 2009/0204906 | A1* | 8/2009 | Irving | 715/753 |
| 2009/0276154 | A1 | 11/2009 | Subramanian et al. | |
| 2010/0045697 | A1 | 2/2010 | Reville et al. | |
| 2010/0083113 | A1* | 4/2010 | Weaver et al. | 715/716 |
| 2010/0223555 | A1* | 9/2010 | Zellner | G06Q 30/04 715/733 |
| 2010/0235085 | A1* | 9/2010 | Kikuchi | G01C 21/367 701/533 |
| 2010/0275135 | A1* | 10/2010 | Dunton et al. | 715/753 |
| 2010/0318291 | A1* | 12/2010 | Gluck | G01C 21/367 701/532 |
| 2011/0009112 | A1* | 1/2011 | Noh | G08C 17/00 455/420 |
| 2011/0055762 | A1* | 3/2011 | Jung | G06F 3/0481 715/835 |
| 2011/0107272 | A1* | 5/2011 | Aguilar | G06F 3/04815 715/853 |
| 2011/0113369 | A1* | 5/2011 | Lazaridis | 715/810 |
| 2011/0153629 | A1* | 6/2011 | Lehmann | G06Q 10/06 707/758 |
| 2011/0246891 | A1* | 10/2011 | Schubert | G06F 9/4445 715/719 |
| 2011/0264246 | A1* | 10/2011 | Pantoja et al. | 700/92 |
| 2011/0270685 | A1* | 11/2011 | Marks | G06Q 30/02 705/14.66 |
| 2011/0296392 | A1 | 12/2011 | Habib et al. | |
| 2012/0143503 | A1* | 6/2012 | Hirai | G01C 21/3688 701/527 |
| 2012/0164947 | A1* | 6/2012 | Kammer et al. | 455/41.2 |
| 2012/0242687 | A1* | 9/2012 | Choi | B60K 35/00 345/629 |
| 2013/0138781 | A1* | 5/2013 | Landow et al. | 709/219 |
| 2013/0145309 | A1* | 6/2013 | Cho | G06F 3/0488 715/784 |
| 2013/0191725 | A1* | 7/2013 | Meadow | G06T 17/05 715/234 |
| 2013/0219303 | A1* | 8/2013 | Eriksson et al. | 715/759 |
| 2014/0053077 | A1* | 2/2014 | Unnikrishnan | G06F 3/04815 715/747 |

OTHER PUBLICATIONS

Written Opinion of the International Searching Authority for corresponding Application No. PCT/EP2013/060345, dated Aug. 28, 2013, 6 pages.

Substantive Examination Report Stage I for corresponding Application No. W00201102621, 1 page.

Office Action for corresponding European Patent Application No. 13 726 133.5-1557, dated Sep. 30, 2016, 5 pages.

* cited by examiner

METHOD AND APPARATUS FOR NAVIGATION USING MULTIPLE SYNCHRONIZED MOBILE DEVICES

RELATED APPLICATIONS

This application is a Continuation in Part of U.S. patent application Ser. No. 13/476,557 filed May 21, 2012 entitled "Method and Apparatus for Navigation Using Multiple Synchronized Devices," which is incorporated herein by reference in its entirety.

BACKGROUND

Service providers and device manufacturers (e.g., wireless, cellular, etc.) are continually challenged to deliver value and convenience to consumers by, for example, providing compelling network services. One area of interest has been the development of mapping and/or navigation applications that provide users of mobile devices (e.g., mobile phones, tablets, personal navigation devices, etc.) with substantially real-time location-based information to assist them with their travels, whether on foot or in a vehicle. However, the display size of most mobile devices is still limited. As a result, the level of available information is also reduced. Moreover, current services are unable to leverage situations where multiple devices are in close proximity to one another (e.g., within a vehicle or associated with a tour group). In addition, in certain contexts, for example, when using a mobile device for navigation while driving, the performance of the device can be constrained by legal requirements (e.g., number of visuals permitted on the screen, their size of the visuals, the maximum number of characters, permitted interactions, etc.). Further, the driver is often limited from performing ordinary gestures with the device (e.g., scrolling, panning, swiping, pinch zooming, etc.). Accordingly, service providers and device manufactures face significant technical challenges in offering a service that provides different views of a common application across multiple devices in a synchronized manner.

SOME EXAMPLE EMBODIMENTS

Therefore, there is a need for an approach for providing different views of an ongoing application across multiple devices in a synchronized manner.

According to one embodiment, a method comprises determining that at least one device and at least one other device are executing at least one common application. The method also comprises causing, at least in part, a synchronization of data for the at least one common application among the at least one device and the at least one other device. The method further comprises determining one or more respective user interface views for presenting the data on the at least one device, the at least one other device, or a combination thereof, wherein the one or more respective user interface views are presented via the at least one common application.

According to another embodiment, an apparatus comprises at least one processor, and at least one memory including computer program code for one or more computer programs, the at least one memory and the computer program code configured to, with the at least one processor, cause, at least in part, the apparatus to determine that at least one device and at least one other device are executing at least one common application. The apparatus is also caused to cause, at least in part, a synchronization of data for the at least one common application among the at least one device and the at least one other device. The apparatus is further caused to determine one or more respective user interface views for presenting the data on the at least one device, the at least one other device, or a combination thereof, wherein the one or more respective user interface views are presented via the at least one common application.

According to another embodiment, a computer-readable storage medium carries one or more sequences of one or more instructions which, when executed by one or more processors, cause, at least in part, an apparatus to determine that at least one device and at least one other device are executing at least one common application. The apparatus is also caused to cause, at least in part, a synchronization of data for the at least one common application among the at least one device and the at least one other device. The apparatus is further caused to determine one or more respective user interface views for presenting the data on the at least one device, the at least one other device, or a combination thereof, wherein the one or more respective user interface views are presented via the at least one common application.

According to another embodiment, an apparatus comprises means for determining that at least one device and at least one other device are executing at least one common application. The apparatus also comprises means for causing, at least in part, a synchronization of data for the at least one common application among the at least one device and the at least one other device. The apparatus further comprises means for determining one or more respective user interface views for presenting the data on the at least one device, the at least one other device, or a combination thereof, wherein the one or more respective user interface views are presented via the at least one common application.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing different views of an ongoing application across multiple devices in a synchronized manner are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
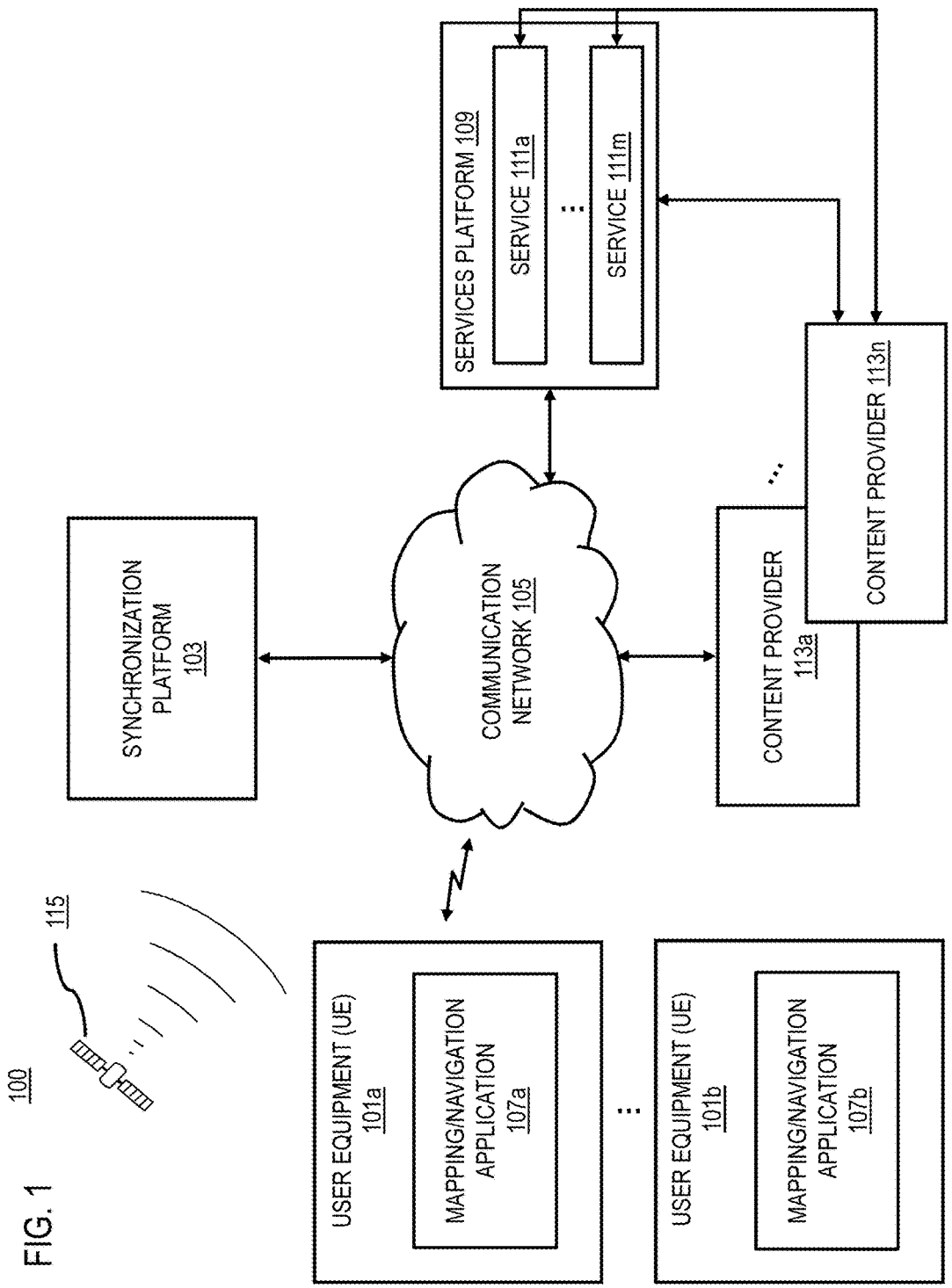
FIG. 1 is a diagram of a system capable of providing different views of an ongoing application across multiple devices in a synchronized manner, according to one embodiment.

FIG. 1 is a diagram of a system capable of providing different views of an ongoing application across multiple devices in a synchronized manner, according to one embodiment. As previously discussed, one area of interest among service providers and device manufactures has been the development of mapping and/or navigation applications (e.g., turn-by-turn navigation applications) that can provide users of mobile devices (e.g., mobile phones, tablets, personal navigation devices, etc.) with substantially real-time location-based information to assist them with their travels, whether on foot or in a vehicle. However, the display size of most mobile devices is still limited. As a result, the level of available information is also reduced. Moreover, current services are unable to leverage situations where multiple devices are in close proximity to one another (e.g., within a vehicle or associated with a tour group). By way of example, drivers using mapping and/or navigation applications on mobile devices often have difficulties deciphering data rich images (e.g., junction views) to quickly find the desired turn or exit they are looking for. Moreover, a driver's capabilities are limited in terms of quickly and easily gesturing across the user interface of his or her mobile device (e.g., scrolling, panning, swiping, pinch zooming, etc.). In addition, in a number of countries, mobile device associated with driving can be constrained by mandatory legal requirements such as the number of visuals permitted on the screen, the size of the visuals, the maximum number of characters, number or type of interactions, etc. If, however, there are several passengers in the vehicle, one or more of the passengers can pair their mobile devices with the driver's device. Consequently, the one or more passengers can help the driver navigate (e.g., by looking at different views of the mapping and/or navigation application in a synchronized manner without the constraints imposed upon the driver). For example, while the driver's device may present a general or optimized navigation view, one or more of the passengers may be viewing a high level route overview or a street view. One solution is to compute the same route with all of the devices and to have different views on each device (e.g., a two-dimensional map view, a augmented and/or mixed reality view, a satellite view, a zoomed out view, etc.), but computing the same route in the context of driving requires considerable manual interaction and does not provide the needed information in most of the difficult use cases (e.g., where food and/or lodging reservations need to be made en route to a destination).

To address this problem, a system 100 of FIG. 1 introduces the capability of providing different views of an ongoing application across multiple devices in a synchronized manner. As shown in FIG. 1, the system 100 comprises at least one user equipment (UE) 101*a* (e.g., a mobile phone, a tablet, a phablet, a personal navigation device, etc.) and at least one other UE 101*b* (e.g., a mobile phone, a tablet, a phablet, a personal navigation device, etc.) (also collectively referred to as UEs 101) having connectivity to a synchronization platform 103 via a communication network 105. In one embodiment, the system 100 has been simplified to include only two UEs 101 (e.g., UE 101*a* and UE 101*b*), however, it is contemplated that multiple UEs 101 can be utilized in connecting with the synchronization platform 103 and with each other (e.g., pairing the UE 101*a* and the UE 101*b*). The UEs 101 also include or have access to a common mapping/navigation application 107*a* and 107*b*, respectively (also collectively referred to as mapping/navigation applications 107). By way of example, the mapping/navigation applications 107 include, at least in part, a navigation application, a mapping application, a location-based application, or a combination thereof (e.g., a turn-by-turn navigation application). In addition, one or more respective user interface views of the mapping/navigation applications 107 include, at least in part, a general navigation screen, an optimized navigation screen, a street view screen, an augmented and/or mixed realty screen including point of interest (POIs) (e.g., identifying nearby and en route restaurants, hotels, cafes, shops, transportation hubs, etc.), a media content screen, a weather en route screen, or a combination thereof. In one embodiment, the synchronization platform 103 may exist in whole or in part within the UEs 101, or independently.

The UEs 101 are also connected to a services platform 109 via the communication network 105. The services platform 109 includes one or more services 111a-111m (also collectively referred as services 111). The services 111 may include a wide variety of services such as content provisioning services for the mapping/navigation applications 107 (e.g., location-based services, advertising services, media streaming services, social networking services, etc.). In addition, the UEs 101 and the services platform 109 are also connected to one or more content providers 113a-113n (also collectively referred to as content providers 113) via the communication network 105. The content providers 113 also may provide a wide variety of content (e.g., one or more maps, one or more advertisements or coupons, location-based audio and/or visual content, etc.) to the components of the system 100.

In one embodiment, the mapping/navigation applications 107 utilize location-based technologies (e.g., GPS, cellular triangulation, Assisted GPS (A-GPS), etc.) to make a request to one or more services 111 for location-based data (e.g., mapping and/or navigation information, location-based audio and/or visual content, etc.) based on a position relative to the UEs 101. For example, a UE 101 may include a GPS receiver to obtain geographic coordinates from the satellites 115 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, phablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 determines that at least one device (e.g., a mobile phone, a tablet, a phablet, a personal navigation device, etc.) and at least one other device (e.g., a mobile phone, a tablet, a phablet, a personal navigation device, etc.) are executing a common application. The common application may be a navigation application, a mapping application, a location-based application, or a combination thereof (e.g., a turn-by-turn navigation application). By way of example, a group of friends or a couple, each with at least one mobile device, may be walking or driving together in an area that is unfamiliar to them and they may want to leverage the availability of the multiple devices to better understand their surroundings. In addition, a passenger may want to benefit from the navigation related information associated with a driver's device without having the capability and legal constraints associated with being the driver and/or the driver's device. In another example use case, a user may be carrying multiple devices (e.g., a mobile phone and a tablet, a mobile phone and a phablet, or two mobile phones), and he or she may similarly want to leverage the additional capabilities and resources offered by having multiple devices.

In one embodiment, the system 100 determines whether the at least one device, the at least one other device, or a combination thereof is within or outside of a range associated with the connection. In particular, it is contemplated that the one or more devices (e.g., the UE 101a and the UE 101b) may connect to one another via one or more short-range wireless communication technologies (e.g., Bluetooth®, Bluetooth® low energy (BLE), near field communications (NFC), wireless fidelity (WiFi), Slam technology, or a combination thereof). For example, in one example use case, two or more persons (e.g., User "A" and User "B") start navigating towards the same destination and both users have mobile devices (e.g., mobile phones), which can exchange dynamic information. User "A" enters the intended destination into his or her mapping/navigation application (e.g., a turn-by-turn navigation application) and starts the guidance system. In another example use case, the system 100 can determine that the at least one device is associated with driving a vehicle based, at least in part, on the one or more short-range wireless communication technologies associated with the vehicle (e.g., Bluetooth®, NFC, or a combination thereof). By way of example, the system 100 can determine that the at least one device is the driver's device based, at least in part, on the device (e.g., the UE 101a) being connected to the car's hands-free system, an access point (AP) within the car (e.g., a Bluetooth® AP), the vehicle's infotainment system (e.g., over MirrorLink™), or a combination thereof.

In one or more embodiments, once the system 100 determines whether the devices are within or outside of the range of the connection type, the system 100 causes, at least in part, a generation of a recommendation to create or disband a group of the at least one device, the at least one other device, or a combination thereof, wherein the synchronization of the data is based, at least in part, on the group. In one embodiment, the system 100 can then determine a request (e.g., an acceptance of the recommendation) to cause a connection of the at least one device (e.g., the device of User "A") and the at least one other device (e.g., the device of User "B"), wherein the synchronization of the data is further based, at least in part, on the connection. In one embodiment, the system 100 next causes a synchronization of data for the at least one common application among the at least one device and the at least one other device. As a result, in this example use case, User "A" and User "B" can now connect their devices (e.g., mobile phones) and common applications (e.g., a turn-by-turn navigation application) in a synchronized mode. In another example use case, the system 100 can synchronize the data for the at least one common application (e.g., destination data) based on a calculation of multiple users' routing preferences to determine a majority routing preference.

In the vehicle example use case, the system 100 can cause, at least in part, the synchronization of data based, at least in part, on an automatic pairing between the at least one device (e.g., the driver's device) and at least one other device (e.g., a passenger's device). Consequently, the system 100 can set the at least one device to a driver mode and at least one other device to a passenger mode. In one embodiment, it is contemplated that the passenger mode can only be accessed by a user when the at least one device is in the driver mode (i.e., navigating in the vehicle). By way of example, if User "A", User "B", User "C", and User "D" are all traveling together in separate vehicles and User "A", User "B", and User "C" want to avoid highways with toll fees, take the most scenic route, etc. and User "D" wants to pay toll fees, to take the most expedient route, etc., then the system 100 will synchronize the data based, at least in part, on the majority decision to avoid highways with toll fees, to take the most scenic route, etc.

In one embodiment, once the at least one device and the at least one other device are connected, the system 100 determines one or more respective user interface views (e.g., a particular screen) for presenting the data on the at least one device, the at least one other device, or a combination thereof, wherein the one or more respective user interface views are presented via the at least one common application (e.g., a turn-by-turn navigation application). By way of example, the one or more respective user interface views include, at least in part, a general navigation screen (e.g., including a map, directions, distances, etc.), an optimized navigation screen (e.g., including only essential navigation elements), a street view screen (e.g., showing an upcoming turn), an offers screen (e.g., depicting coupons associated with nearby businesses), an augmented and/or mixed reality screen including points-of-interest (POIs) (e.g., identifying nearby and en route restaurants, hotels, cafes, shops, transportation hubs, etc.), a media content screen (e.g., depicting images of nearby buildings, audio and/or visual tour information, etc.), a weather en route screen (e.g., current and/or future weather details), or a combination thereof. In particular, the system 100 determines the one or more respective user interface views based, at least in part, on location information (e.g., based on GPS sensors, a compass, a magnetometer, etc.), device capability information (e.g., location-based sensors, display capabilities, processing capabilities, an accelerometer, a light sensor, a gyroscope, a titling angle detection sensor, a proximity sensor, etc.), resource availability information (e.g., battery status, power management, etc.), user input, or a combination thereof associated with the at least one device, the at least one other device, or a combination thereof. Moreover, the system 100 determines the location information, the device capability information, the resource availability information, the user input, or a combination thereof based, at least in part, on determining the sensor data from the at least one device, the at least one other device, or a combination thereof in a synchronized manner.

In the vehicle use case, as a result of the synchronization of data, one or more passengers are able to use one or more of the one or more respective user interface views to assist the driver with navigation. By way of example, when a driver has activated a navigation application on his or device and then arrives at a complex intersection (e.g., a busy roundabout), he or she may be able to see the route on his or her device, but may still be uncertain as to where to go next. In contrast, one or more passengers can use their devices to zoom in and out of the optimized navigation screen or the street view screen, enable satellite images to better visualize the driving lanes, switch back and forth between the general navigation screen and the augmented and/or mixed reality screen (e.g., using a mobile phone and a tablet), etc. to help the driver make the right turn. In another example use case, the driver has entered the destination on his or her device, but due to an anticipated late arrival at the destination, food and/or lodging reservation need to be made en route, which the driver is prohibited from doing while driving. In contrast, one or more passengers can user their devices to look for different nearby POIs by panning along the route and/or can search for relevant POIs around the destination using the augmented and/or mixed reality screen including POIs, for example. In a further example use case, the driver has entered the destination on his or her device, but, as previously discussed, is prohibited from interacting with the device while driving. Consequently, one or more passengers can use their devices to check out three-dimensional representations of buildings and their names along the way (e.g., using the augmented and/or mixed reality screen), activate other important nearby POIs, review user generated and/or research content about the nearby POIs, etc.

The system 100 next processes the location information to determine relative positioning information of the at least one device with respect to the at least one other device, wherein the determining of the one or more respective user interface views is based, at least in part, on the relative positioning information. By way of example, in one example use case, four users (e.g., User "A", User "B", User "C", and User "D") are part of a tour group exploring an unfamiliar city together. As in the previous example use case, User "A" calculates an interesting route on his or her mobile device (e.g., a mobile phone) and then attempts to connect with the other devices. In one embodiment, the system 100 also determines the one or more respective interface views based, at least in part, on one or more legal requirements associated with driving the vehicle. For example, in certain countries, the at least one device (e.g., the driver's device) must comply with mandatory legal requirements such as the number of visuals that are permitted on the screen at one time, the size of the visuals, the maximum number of characters, the type or number of interactions, etc. In addition, the at least one device must comply with one or more limitations in terms of content that can be displayed while driving (e.g., only a few street names may be displayed). Also, certain gestures are not permitted by the driver while driving (e.g., scrolling, panning, swiping, pinch zooming, etc.).

The connections among the devices, enables the system 100 and the various users to determine the position of each of the devices relative to one another. In addition, the connection of the devices enables the system 100 and each of the devices to determine the respective user interface view of each of the devices. As a result, it is contemplated that the system 100 can push the right information (e.g., respective user interface views) to each device and therefore ensure that each device displays different information to best leverage the availability of multiple screens among the group. In the vehicle example use case, when the system 100 determines that the at least one other device is associated with a passenger (e.g., based on the pairing), the system 100 can enable the passenger to use one or more of the various data rich interface views (e.g., the street view screen, the augmented and/or mixed reality screen including POIs, the media content screen, the weather en route screen, etc.) and interact with the user interface without one or more gestural limitations imposed on the driver and/or his or her device (e.g., scrolling, panning, swiping, pinch zooming, etc.).

In one embodiment, the system 100 can also determine at least one lead device from among the at least one device, the at least one other device, or a combination thereof based, at least in part, on the location information, the device capability information, the resource availability information, the user input, or a combination thereof. In one example use case, the system 100 may determine the lead device (e.g., the device associated with User "A" or User "B") based, at least in part, on the fact that while all four users started out walking together, User "A" and User "B" are now approximately 50 meters ahead of User "C" and User "D". Consequently, the system 100 determines to present User "A" with the general navigation screen or the optimized navigation screen and to present User "B" with the street view screen, for example, since User "A" and User "B" will be the first to reach a particular turn relative to User "C" and User "D". In contrast, the system 100 may determine that User "C" and/or User "D" are more interested in investigating their surroundings. As a result, the system 100 may present User "C" and User "D" with the offers screen, the augmented and/or mixed reality screen including POIs, the media content screen, or the weather en route screen, respectively.

In another example use case, the system 100 may determine the lead device based, at least in part, on the fact that the system 100 determines that User "A" is using a tablet and therefore has a larger screen, which may be better suited to present the general navigation screen compared to a mobile phone, for example, that the system 100 determines User "B" is using. Moreover, in the walking example use case, the system 100 may determine at some later point that while User "A" and User "B" are still walking together, the device of User "B" is running low on battery power. Therefore, the system 100 can switch the respective user interface views so that the device of User "A" is now running the street view screen, which generally consumes more power compared to the navigation screens, and the device of User "B" is now running the optimized navigation screen, for example, to better conserve battery power. Further, as previously discussed, the system 100 may determine the lead device (e.g., the driver's device) based, at least in part, on the one or more short-range wireless communication technologies associated with the vehicle (e.g., Bluetooth®, NFC, or a combination thereof). For example, the system 100 can determine the driver's device based, at least in part, on the device (e.g., the UE 101*a*) being connected to the car's hands-free system, an access point within the car (e.g., a Bluetooth® AP), the vehicle's infotainment system (e.g., over MirrorLink™), or a combination thereof. As a result, the system 100 determines the most relevant information to present to each of the users.

In certain embodiments, the system 100 can also determine on which of the at least one device, the at least one other device, or a combination thereof to present guidance information (e.g., voice commands) based, at least in part, on the one or more respective user interface views presented on the at least one device, the at least one other device, or a combination thereof. As previously discussed, the system 100 determines the respective user interface views based, at least in part, on the location information, the device capability information, the resource availability information, the user input, the one or more legal requirements, or a combination thereof. Based on the relative positioning information, the system 100 may determine that voice commands may not need to be played on all four devices or both devices in a particular group (e.g., User "A" and User "B" or User "C" and User "D"), which can conserve the battery power of the devices not rendering the guidance information and also prevent overlapping voice commands, which is often more distracting than helpful. In another example use case, if one user (e.g., User "A") is talking on his or her mobile device (e.g., a mobile phone), the system 100 can detect this activity based, at least in part, on a proximity sensor in the mobile device or through the cellular network activity, and can then split the information being presented on User "A"'s device (e.g., voice commands) among the remaining devices for the duration of that call. Further, in one embodiment, it is contemplated that an incoming telephone call to the driver's device may interrupt the guidance commands and therefore the system 100 can forward the call to one or more other devices within the vehicle using one or more short-range wireless communication technologies associated with the vehicle, for example.

In one embodiment, the system 100 may also determine at least one change in the relative positioning information and therefore cause, at least in part, a redetermination of the one or more respective user interface views based, at least in part, on the at least one change. By way of example, using the walking example use case, at some later point in time, User "A" and User "B" may want to spend more time investigating their surroundings and/or various point-of-interests and as a result User "C" and User "D" will become approximately 50 meters ahead of User "A" and User "B". In this instance, it is contemplated that the system 100 would determine the change in relative positioning information and consequently present User "C" or "D" with the general navigation screen or optimized navigation screen and the street view screen, respectively, and then present User "A" or User "B" with the offers screen, the augmented and/or mixed reality screen including POIs, the media content screen, the weather en route screen, respectively. In one example use case, a change in the relative positioning information may also include one or more determinations by the system 100 that one or more users and/or devices have joined or left the group. As previously discussed, because the passenger mode can only be accessed when at least one device is in the driver mode, if the system 100 determines that the driver and his or her device have exited the vehicle, the system 100 will disable the passenger mode of the one or more other devices.

By way of example, the UEs 101, the synchronization platform 103, the mapping/navigation applications 107, the services platform 109, the services 111, the content providers 113, and the satellites 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
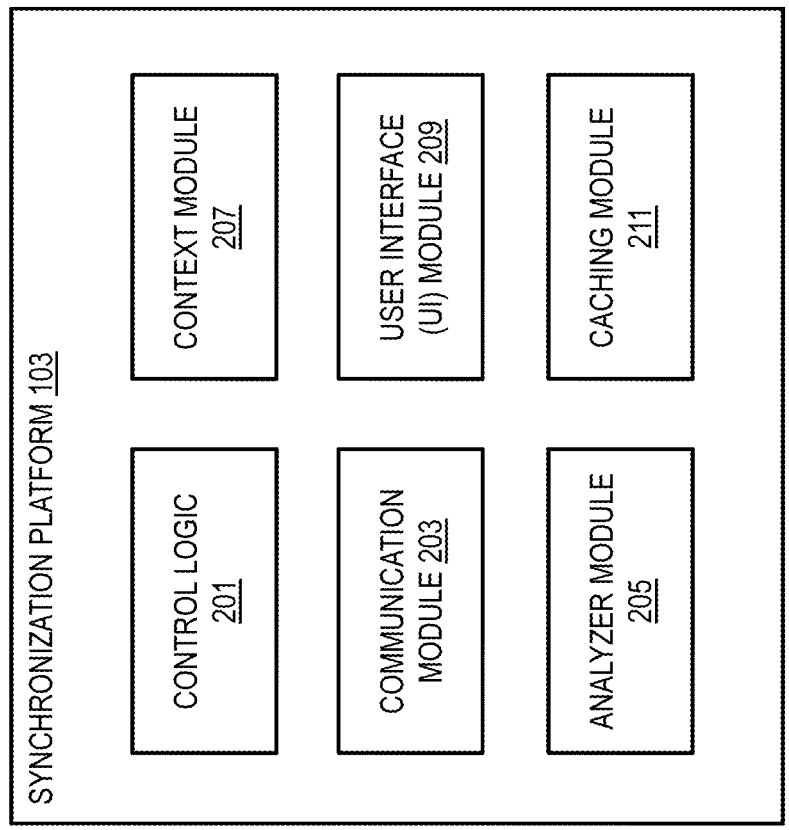
FIG. 2 is a diagram of the components of a synchronization platform, according to one embodiment.

FIG. 2 is a diagram of the components of synchronization platform 103, according to one embodiment. By way of example, the synchronization platform 103 includes one or more components for providing different views of an ongoing application across multiple devices in a synchronized manner. It is contemplated that the functions of these components may be combined in one or more components or performed by other components of equivalent functionality. In this embodiment, the synchronization platform 103 includes a control logic 201, a communication module 203, an analyzer module 205, a context module 207, a user interface (UI) module 209, and a caching module 211.

The control logic 201 oversees tasks, including tasks performed by the communication module 203, the analyzer module 205, the context module 207, the user interface (UI) module 209, and the caching module 211. For example, although other modules may perform the actual task, the control logic 201 may determine when and how those tasks are performed or otherwise direct the other modules to perform the task. In addition, the control logic 201 may be used in connection with the communication module 203 to cause, at least in part, a synchronization of data for the at least one common application (e.g., a turn-by-turn navigation application) among the at least one device and the at least one other device. The control logic 201 may also be used in connection with the analyzer module 205 to synchronize the data for the at least one common application based, at least in part, on a majority determination of preferences (e.g., routing preferences). The control logic 201 also may be used in connection with the analyzer module 205 to cause a redetermination of the one or more respective user interface views based, at least in part, on one or more changes in the relative positioning information (e.g., if one or more users changes positions and/or if one or more users joins or leaves the group).

The communication module 203 is used for communication between the UEs 101, the synchronization platform 103, the mapping/navigation applications 107, the services platform 109, the services 111, the content providers 113, and the satellites 115. The communication module 203 may also be used to communicate commands, requests, data, etc. In one embodiment, the communication module 203, in connection with the analyzer module 205, also may be used to determine that at least one device (e.g., a mobile phone, a tablet, a phablet, a personal navigation device, etc.) and at least one other device (e.g., a mobile phone, a tablet, a phablet, a personal navigation device, etc.) are executing at least one common application (e.g., a turn-by-turn navigation application). The communication module 203, in connection with the user interface module 209, may also be used to generate a recommendation to create or disband a group of the at least one device, the at least one other device, or a combination therefore. Consequently, the communication module 203 also may be used to determine a request (e.g., an acceptance of the recommendation) to cause, at least in part, a connection of the at least one device (e.g., the UE 101*a*) and the at least one other device (e.g., the UE 101*b*). In particular, the communication module 203 may also facilitate a connection via one or more short-range wireless communication technologies (e.g., Bluetooth®, BLE, NFC, WiFi, Slam technology, or a combination thereof). More specifically, the communication module 203 also may be used to determine that the least one device is associated with driving a vehicle (i.e., the driver's device) based, at least in part, on the one or more short-range wireless communication technologies associated with the vehicle (e.g., Bluetooth®, NFC, WiFi, or a combination thereof). As previously discussed, the communication module 203, in connection with the control logic 201, also may be used to cause a synchronization of data for the at least one common application among the at least one device (e.g., the UE 101*a*) and the at least one other device (e.g., the UE 101*b*).

In one or more embodiments, the analyzer module 205, in connection with the communication module 203, determines that at least one device (e.g., the UE 101*a*) and at least one other device (e.g., the UE 101*b*) are executing at least one common application (e.g., a turn-by-turn navigation application). The analyzer module 205 may also be used in connection with the context module 207 to determine whether the at least one device (e.g., the UE 101*a*), the at least one other device (e.g., the UE 101*b*), or a combination thereof is within or outside of a range associated with the connection. As previously discussed, the connection is based on one or more short-range wireless communication technologies (e.g., Bluetooth®, BLE, NFC, WiFi, Slam technology, or a combination thereof), each having various range characteristics. The analyzer module 205 also may be used to determine one or more respective user interface views for presenting the data on the at least one device (e.g., the UE 101*a*), the at least one other device (e.g., the UE 101*b*), or a combination thereof. In particular, the analyzer module 205 determines the one or more respective user interface views based, at least in part, on location information, device capability information, resource availability information, user input, or a combination thereof. In addition, in one embodiment, the analyzer module 205 may be used to determine the one or more respective interface views based, at least in part, on one or more legal requirements associated with driving the vehicle. Furthermore, the analyzer module 205 also determines the location information, the device capability information, the resource availability information, the user input, or a combination thereof based, at least in part, on a determining of sensor data from the at least one device (e.g., the UE 101*a*), the at least one other device (e.g., the UE 101*b*), or a combination thereof in a synchronized manner. As previously discussed, the connection of the devices (e.g., pairing of the UE 101*a* and the UE 101*b*) enables the analyzer module 205 to determine the respective user interface views of each of the devices (e.g., the UEs 101). Consequently, the analyzer module 205, in connection with the communication module 203 and user interface module 209, can then push the right information (e.g., respective user interface views) to each device (e.g., the UEs 101) to ensure that each device displays different information to best leverage the availability of multiple screens among the group.

In certain embodiments, the analyzer module 205 may also be used in connection with the context module 207 to determine at least one lead device (e.g., the UE 101*a*) from among the at least one device, the at least one other device, or a combination therefore based on the location information, the device capability information, the resource availability information, the user input, or a combination thereof. In the vehicle example use case, the analyzer module 205 and the context module 207, in connection with the communication module 203, also may be used to determine which one of the devices is being used by the driver of the vehicle based, at least in part, on the one or more short-range wireless communication technologies associated with the vehicle, location information (e.g., on or near the driver's seat), or a combination thereof. The analyzer module 205 also may be used to determine on which of the at least one device (e.g., the UE 101*a*), the at least one other device (e.g., the UE 101*b*), or a combination thereof to present guidance information based, at least in part, on the one or more respective user interface views on the at least one device, the at least one other device, or a combination thereof. Further, as previously discussed, the analyzer module 205, in connection with the control logic 201, may be used to facilitate a redetermination of the one or more respective user interface views based, at least in part, on at least one change in the relative positioning information.

In one embodiment, the context module 207 may be used to determine the geographic context or situation of the UEs 101 by utilizing one or more location-based technologies (e.g., GPS receivers, cellular triangulation, A-GPS, etc.) to determine location-based information regarding the UEs 101. More specifically, the context module 207 is used to determine whether the at least one device (e.g., the UE 101*a*), the at least one other device (e.g., the UE 101*b*), or a combination thereof is within or outside of a range associated with a connection among the devices (e.g., the UEs 101). As previously discussed, the connection is based on one or more short-range wireless communication technologies (e.g., Bluetooth®, BLE, Slam technology, etc.). The context module 207 also may be used to process the location information of the at least one device, the at least one other device, or a combination thereof to determine the relative positioning information of the devices (e.g. that the UE 101*a* is approximately 50 meters ahead of the UE 101*b*, the UE 101*a* and the UE 101*b* are within a vehicle, the UE 101*a* is on or near the driver's seat, etc.). As previously discussed, the context module 207, in connection with the analyzer module 205, may also be used to determine at least one lead device (e.g., the driver's device) and to determine on which of the at least one device, the at least one other device, or a combination thereof to present guidance information based, at least in part, on the one or more respective user interface views. Further, the context module 207 also may be used to determine at least one change in the relative positing information (e.g., if one or more of the UEs 101 changes positions, if one or more the UEs 101 joins or leaves the group, if one of the passenger takes over the driving responsibilities, etc.).

The user interface (UI) module 209 is used in connection with the analyzer module 205 to render one or more respective user interface views for presenting data on the at least one device (e.g., the UE 101*a*), the at least one other device (e.g., the UE 101*b*), or a combination thereof, wherein the one or more respective user interface views are presented via the at least one common application (e.g., a turn-by-turn navigation application). As previously discussed, the one or more respective user interface views include, at least in part, a general navigation screen, an optimized navigation screen, a street view screen, an offers screen, an augmented and/or mixed reality screen including nearby and en route POIs, a media content screen, a weather en route screen, or a combination thereof. The user interface module 209 may also be used in connection with the communication module 203 to generate one or more recommendations on the UEs 101 to create or to disband a group of the at least one device (e.g., the UE 101*a*), the at least one other device (e.g., the UE 101*b*), or a combination thereof.

The caching module 211 may be used to temporarily store the location information, the device capability information, the resource availability information, the user input, or a combination thereof in between one or more changes and/or redeterminations. The caching module 211 also may be used in connection with the analyzer module 205 to store information regarding the respective user interface views of each of the devices (e.g., the one or more legal requirements) to ensure that each device is displaying different information to best leverage the availability of multiple screens among the group.

Figure 3:
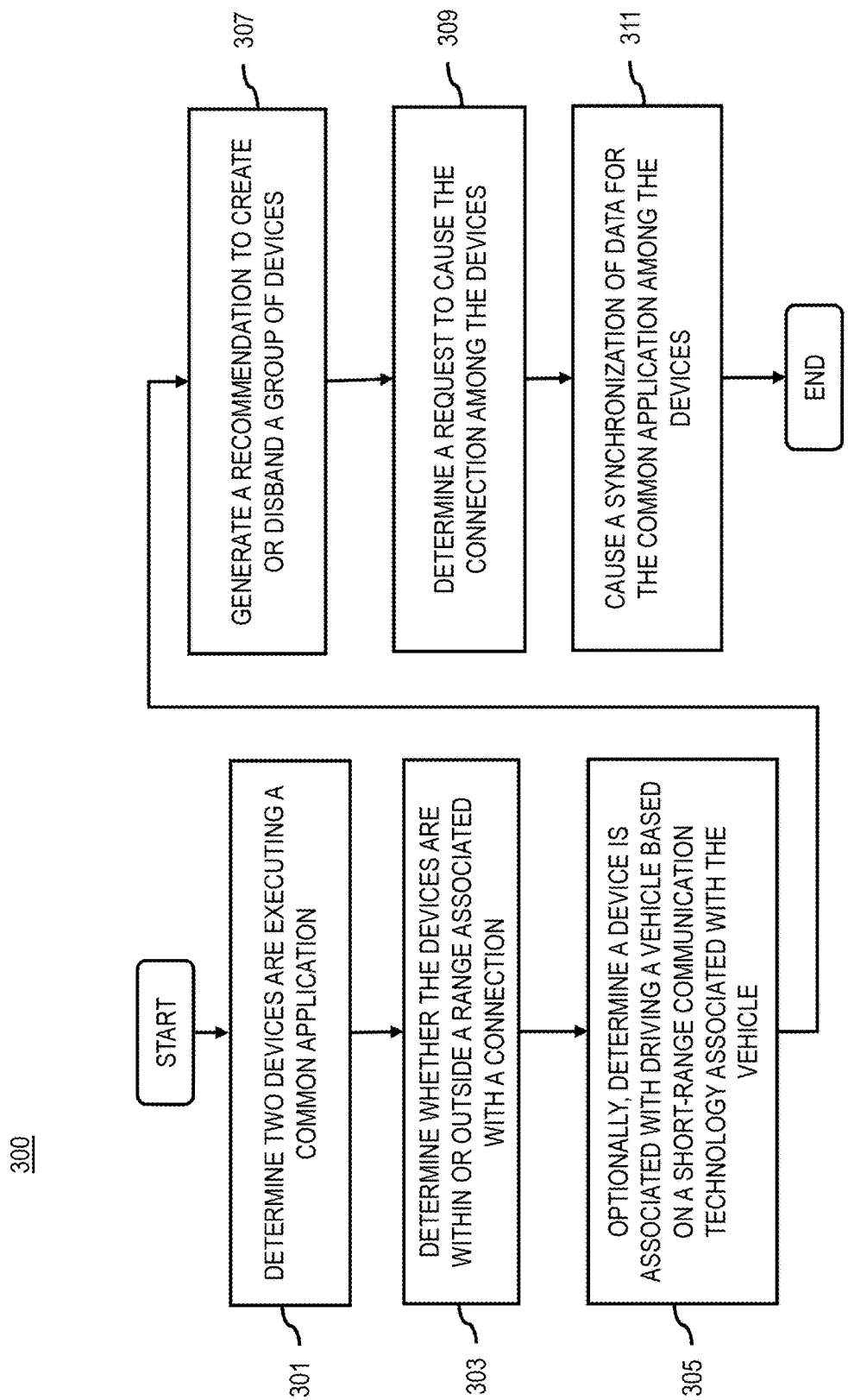
FIGS. 3 and 4 are flowcharts of processes for providing different views of an ongoing application across multiple devices in a synchronized manner, according to one embodiment.
Figure 4:
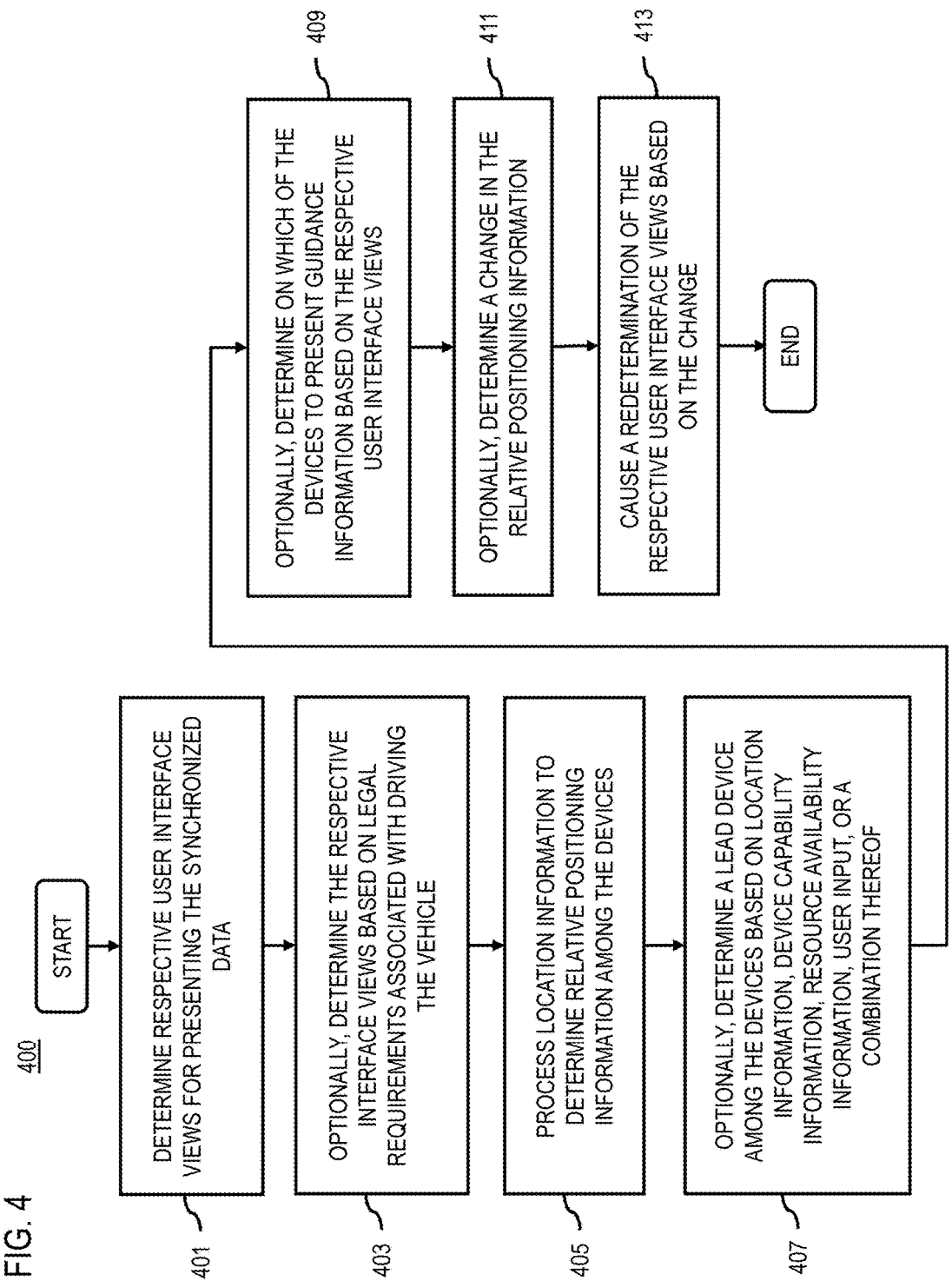
Figure 8:
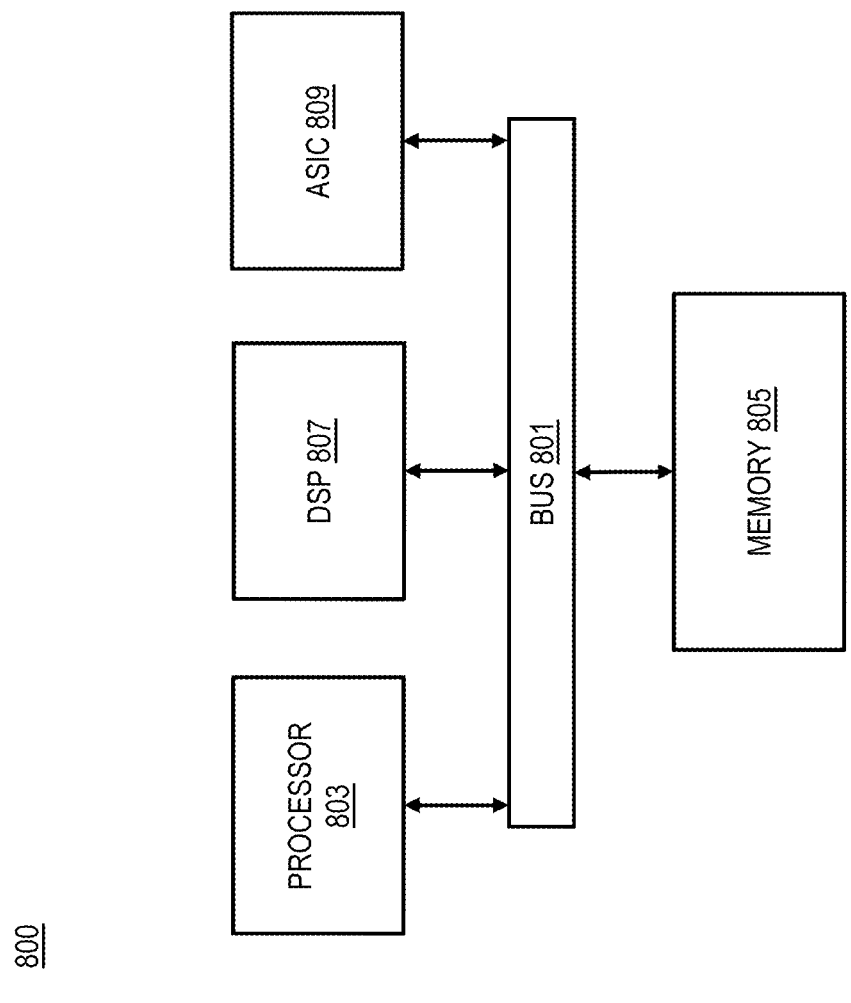
FIG. 8 is a diagram of a chip set that can be used to implement an embodiment of the invention.

FIGS. 3 and 4 are flowcharts of processes for providing different views of an ongoing application across multiple devices in a synchronized manner, according to one embodiment. FIG. 3 depicts a process 300 of synchronizing data for the at least one common application among the at least one device and the at least one other device. In one embodiment, the synchronization platform 103 performs the process 300 and is implemented in, for instance, a chip set including a processor and a memory as shown in FIG. 8. In step 301, the synchronization platform 103 determines that at least one device and at least one other device are executing at least one common application. By way of example the at least one device, the at least one other device, or a combination thereof may include a mobile phone, a tablet, a phablet, a personal navigation device, etc. Moreover, the common application may be a navigation application, a mapping application, a location-based application, or a combination thereof (e.g., a turn-by-turn navigation applications). As previously discussed, in one example use case, a group of friends or a couple, each with at least one mobile device, may be walking or driving together in an area that is unfamiliar to them and they may want to leverage the availability of the multiple devices to better understand their surrounds. In addition, a passenger in a vehicle may want to benefit from the navigation related information associated with the driver's device without having the capability and/or legal constraints associated with being the driver and/or the driver's device.

In step 303, the synchronization platform 103 determines whether the at least one device, the at least one other device, or a combination thereof is within or outside of a range associated with the connection. By way of example, it is contemplated that the devices (e.g., the UEs 101) may connect to one another via one or more short-range wireless communication technologies (e.g., Bluetooth®, BLE, NFC, WiFi, Slam technology, or a combination thereof). As previously discussed, in one example use case, two or more persons (e.g., User "A" and User "B") start navigating towards the same destination and both users have mobile devices (e.g., mobile phones) which can exchange dynamic information.

In step 305, the synchronization platform 103 optionally determines that the at least one device is associated with driving a vehicle based, at least in part, on one or more short-range wireless communication technologies associated with the vehicle. For example, the system 100 can determine that the at least one device (e.g., the UE 101a) is the driver's device based, at least in part, on the device being connected to the car's hands-free system, an access point within the car (e.g., a Bluetooth® AP), the vehicle's infotainment system (e.g., over MirrorLink™), or a combination thereof.

In step 307, the synchronization platform 103 causes, at least in part, a generation of a recommendation to create or to disband a group of the at least one device, the at least one other device, or a combination thereof, wherein the synchronization of the data is based, at least in part, on the group. For example, the synchronization platform may visually prompt User "A" and User "B" to continue the mapping and/or navigation application in a synchronized mode using split screens.

In step 309, the synchronization platform 103 determines a request to cause, at least in part, a connection of the at least one device and the at least one other device, wherein the synchronization of the data is based, at least in part, on the connection. By way of example, the request may simply include an acceptance of the recommendation. In step 309, the synchronization platform 103 causes, at least in part, a synchronization of data for the at least one common application among the at least one device and the at least one other device. As a result, in the example use case, User "A" and User "B" can now connect their devices (e.g., mobile phones) and common applications (e.g., a turn-by-turn application) in a synchronized manner. In another example use case, the synchronization platform 103 can synchronize the data for the at least one common application (e.g., destination data) based on a calculation of multiple users' routing preferences to determine a majority routing preference (e.g., a desire to avoid highways with toll fees, to take the most scenic route, etc.). In addition, in the vehicle example use case, the synchronization platform 103 can cause, at least in part, the synchronization of data based, at least in part, on an automatic pairing between the at least one device (e.g., the driver's device) and at least one other device (e.g., a passenger's device). Consequently, the synchronization platform 103 can set the at least one device to a driver mode and at least one other device to a passenger mode. As previously discussed, the passenger mode can only be accessed by a user when the at least one device is in the driver mover (i.e., associated with navigating the vehicle).

FIG. 4 depicts a process 400 of determining one or more respective user interface views for presenting the data on the at least one device, the at least one other device, or a combination thereof. In one embodiment, the synchronization platform 103 performs the process 400 and is implemented in, for instance, a chip set including a processor and a memory as shown in FIG. 8. In step 401, the synchronization platform 103 determines one or more respective user interface views for presenting the data on the at least one device, the at least one other device, or a combination thereof, wherein the one or more respective user interface views are presented via the at least one common application. As previously discussed, the one or more respective user interface views include, at least in part, a general navigation screen (e.g., including a map, directions, distances, etc.), an optimized navigation screen (e.g., including only essential navigation elements), a street view screen (e.g., showing the next turn), an offers screen (e.g., depicting coupons associated with nearby businesses), an augmented and/or mixed reality screen including POIs (e.g., identifying nearby and en route restaurants, hotels, cafes, shops, transportation hubs, etc.), a media content screen (e.g., depicting images of famous buildings, audio tour information, etc.), a weather en route screen (e.g., current and/or future weather details), or a combination thereof. Furthermore, the synchronization platform 103 determines the one or more respective user interface views based, at least in part, on location information (e.g., based on GPS sensors, a compass, a magnetometer, etc.), device capability information (e.g., location-based sensors, display capabilities, processing capabilities, an accelerometer, a light sensor, a gyroscope, a tilting angle detection sensor, a proximity sensor, etc.), resource availability information (e.g., battery status, power management, etc.), user input, or a combination thereof associated with the at least one device, the at least one other device, or a combination thereof. In addition, the synchronization platform 103 determines the location information, the device capability information, the resource availability information, the user input, or a combination thereof based, at least in part, on a determining of sensor data from the at least one device, the at least one other device, or a combination thereof in a synchronized manner.

In step 403, the synchronization platform 103 optionally determines the one or more respective interface views based, at least in part, on one or more legal requirements associated with driving the vehicle. For example, as previously discussed, in certain countries, the at least one device (e.g., the driver's device) must comply with mandatory legal requirements such as the number of visuals that are permitted on the screen at one time, the size of the visuals, the maximum number of characters, the type or number of interactions, etc. In addition, the at least one device must comply with one or more limitations in terms of content that can be displayed while driving (e.g., only a few street names are displayed). Also, certain gestures are not permitted while driving (e.g., scrolling, panning, swiping, pinch zooming, etc.).

In step 405, the synchronization platform 103 processes and/or facilitates a processing of the location information to determine relative positioning information of the at least one device with respect to the at least one other device, wherein the determining of the one or more respective user interface views is based, at least in part, on the relative positioning information. As previously discussed, in one example use case, while all four users (e.g., User "A", User "B", User "C", and User "D") started out walking together as part of a group tour, User "A" and User "B" are now 50 meters ahead of User "C" and User "D". Consequently, the synchronization platform 103 may then determine to present User "A" with the general navigation screen or the optimized navigation screen and User "B" with the street view screen, for example, since User "A" and User "B" will be the first to reach a particular turn relative to User "C" and User "D".

In step 407, the synchronization platform 103 optionally determines at least one lead device from among the at least one device, the at least one other device, or a combination thereof based, at least in part, on the location information, the device capability information, the resource information, the user input, or a combination thereof. By way of example, in the previous example use case, the lead device (e.g., the device associated with either User "A" or User "B") may be determined by the synchronization platform 103 based, at least in part, on the fact that User "A" and User "B" are approximately 50 meters ahead of User "C" and User "D". In another example use case, the synchronization platform 103 may determine the lead device based on the fact that the synchronization platform 103 determines that User "A" is using a tablet and therefore has a larger screen, which may be better suited to present the general navigation screen compared to the mobile phone, for example, that the synchronization platform 103 determines is being used by User "B". Further, as previously discussed, the synchronization platform 103 may determine the lead device (e.g., the driver's device) based, at least in part, on the one or more short-range wireless communication technologies associated with the vehicle (e.g., Bluetooth®, NFC, or a combination thereof).

In step 409, the synchronization platform 103 optionally determines on which of the at least one device, the at least one other device, or a combination thereof to present guidance information based, at least in part, on the one or more respective user interface views presented on the at least one device, the at least one other device, or a combination thereof. By way of example, the guidance information may include voice commands, audio and/or visual clues, etc. As previously discussed, the synchronization platform 103 determines the respective user interface views based, at least in part, on the location information, the device capability information, the resource availability information, the user input, or a combination thereof. Furthermore, the synchronization platform 103 determines the location information, the device capability information, the resource availability information, the user input, or a combination thereof based, at least in part, on a determining of sensor data from the at least one device, the at least one other device, or a combination thereof in a synchronized manner. Based on the relative positioning information, the synchronization platform 103 may determine that the guidance information (e.g., voice commands, audio cues, etc.) may not need to be simultaneously played on all four devices or both devices in a particular group (e.g., User "A" and User "B" or User "C" and User "D"), which can conserve the battery power of the devices not rendering the guidance information and also prevent overlapping voice commands, which is often more distracting than helpful. In another example use case, if one user (e.g., User "A") is talking on his or her mobile device (e.g., a mobile phone), the synchronization platform 103 can detect this activity based, at least in part, on a proximity sensor in the mobile device or through the cellular network activity, and can then split the information being presented on User "A"'s device (e.g., voice commands) among the remaining devices for the duration of that telephone call. Further, in one embodiment, it is contemplated that an incoming telephone call to the driver's device may interrupt the guidance commands and therefore the synchronization platform 103 can forward the call to one or more other devices within the vehicle using one or more short-range wireless communication technologies associated with the vehicle, for example.

In step 411, the synchronization platform 103 optionally determines at least one change in the relative positioning information and in step 411, the synchronization platform 103 causes, at least in part, a redetermination of the one or more respective user interface views based, at least in part, on the at least one change. By way of example, continuing with the same example use case, at some point later in time User "A" and User "B" may want to spend more time investigating their surroundings and/or various point-of-interests and as a result User "C" and User "D" will now become approximately 50 meters ahead of User "A" and User "B". In this instance, it is contemplated that the synchronization platform 103 would determine the change in relative positioning information and consequently present User "C" or "D" with the general navigation screen or optimized navigation screen and the street view screen, respectively, and then present User "A" or User "B" with the offers screen, the augmented and/or mixed reality screen including POIs, the media content screen, the weather en route screen, respectively. In another example use case, a change in the relative positioning information may also include one or more determinations by the synchronization platform 103 that one or more users and/or devices have joined or left the group. Further, because it is contemplated that the passenger mode can only be accessed when at least one device is in the driver mode, if the synchronization platform 103 determines that the driver and his or her device have exited the vehicle, the synchronization platform 103 will disable the passenger mode of the one or more other devices.

Figure 5B:
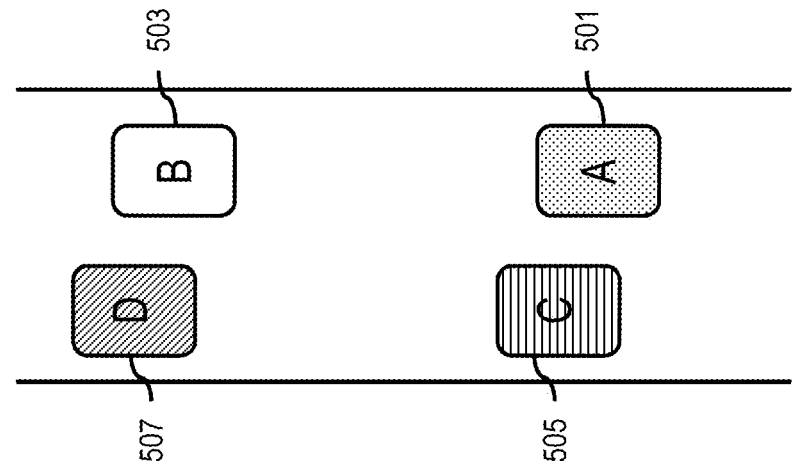
FIGS. 5A and 5B are diagrams of an example use case depicting the utilization of the processes of FIGS. 3 and 4, according to various embodiments.
Figure 5A:
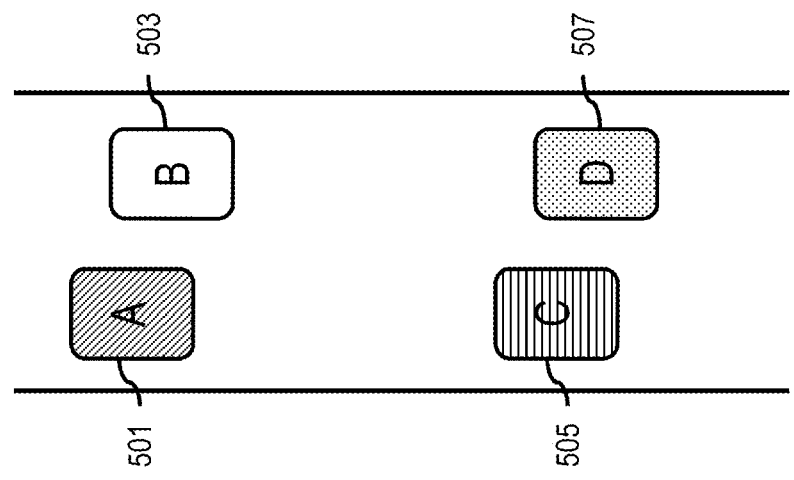

FIGS. 5A and 5B are diagrams of an example use case depicting the utilization of the processes of FIGS. 3 and 4, according to various embodiments. As shown, FIG. 5A depicts four users (e.g., User "A", User "B", User "C", User "D") using mobile devices 501, 503, 505, and 507, respectively (e.g., a mobile phone, a tablet, a phablet, a personal navigation device, etc.). In one example use case, the four users are part of a walking tour that is starting to explore an unfamiliar city together. In another example use case, the four users are in a vehicle driving through the same unfamiliar city. In the walking example use case, User "A" calculates an interesting route on his or her mobile device 501 (e.g., a mobile phone) and then attempts to connect with the other devices (e.g., devices 503, 505, and 507). In the vehicle example use case, User "A" (i.e., the driver) enters a destination on his or her mobile device 501 (e.g., a well-known POI) and starts a navigation application. In the walking example use case, the system 100 determines whether the devices (e.g., devices 501, 503, 505, and 507) are executing a common application (e.g. a turn-by-turn navigation application). In particular, all four devices are in fact executing the same common application in the walking example use case. However, in the vehicle example use case, it may not make sense to simultaneously compute the same route on all four devices (e.g., devices 501, 503, 505, and 507) since that requires considerable manual interaction and may not provide the needed information in most of the difficult use cases (e.g., where the food and/or lodging reservations need to be made en route to a destination).

In one embodiment, the system 100 then determines whether the devices (e.g., devices 503, 505, and 507) are within range associated with the connection (e.g., Bluetooth®, BLE, Slam technology, etc.). In the both the walking and the vehicle example use cases, the system 100 determines that the devices 503, 505, and 507 are all within a range of one or more short-range wireless communication technologies (e.g., Bluetooth®). In the walking example use case, the system 100 next causes, at least in part, a generation of a recommendation to create or disband a group, wherein the synchronization of the data among the devices is based, at least in part, on the group. Because all four users are part of the same tour group, each of the users accepts the recommendation on his or her device, and the system 100 can then cause a synchronization of data for the at least common application among the devices (e.g., a turn-by-turn navigation application). Similarly, in the vehicle example use case, the system 100 can cause, at least in part, the synchronization of data among the one or more devices based, at least in part, on an automatic pairing between the driver's device 501 and the passengers' devices 503, 505, and 507. Consequently, the system 100 can set the device 501 to a driver mode and the passengers' devices 503, 505, and 507 to a passenger mode.

In one embodiment, once the system 100 causes a synchronization of data for the at least common application among the devices (e.g., devices 501, 503, 505, and 507), the system 100 determines one or more respective user interface views (e.g., a particular screen) for presenting the data on the devices, wherein the one or more respective user interface views are presented via the at least one common application (e.g., a turn-by-turn navigation application). As previously discussed, the one or more respective user interface views include, at least in part, a general navigation screen, an optimized navigation screen, a street view screen, an offers screen, an augmented and/or mixed use screen including POIs, a media content screen, a weather en route screen, or a combination thereof. Moreover, the system 100 determines the one or more respective user interface views based, at least in part, on location information, device capability information, resource availability information, user input, or a combination thereof associated with the devices (e.g., devices 501, 503, 505, and 507). In the vehicle example use case, the system 100 can also determine the one or more respective user interface views based, at least in part, on one or more legal requirements associated with driving the vehicle. Furthermore, the system 100 determines the location information, the device capability information, the resource availability information, the user input, or a combination thereof based, at least in part, on a determining of sensor data from the devices (e.g., devices 501, 503, 505, and 507) in a synchronized manner. As previously discussed, the connections among the devices (e.g., devices 501, 503, 505, and 507) enables the system 100 and the various users (e.g., User "A", User "B", User "C", and User "D") to determine the position of each of the devices relative to one another as well as to determine the respective user interface view of each of the devices.

In one embodiment, the system 100 can also determine at least one lead device (e.g., device 501) from among the devices based, at least in part, on the location information, the device capability information, the resource information, the user input, or a combination thereof. In the vehicle example use case, the system 100 can further determine that the lead device (e.g., device 501) is associated with driving a vehicle (i.e., the driver's device) based, at least in part, on the one or more short-range wireless communication technologies associated with the vehicle (e.g., Bluetooth®, NFC, or a combination thereof). More specifically, the system 100 can determine that the device 501 is the driver's device based, at least in part, on the device 501 being connected to the vehicle's hands-free system, an AP within the vehicle (e.g., a Bluetooth® AP), the vehicle's infotainment system (e.g., over MirrorLink™), or a combination thereof.

As shown in FIG. 5A, although all four users may have started out walking or driving together, User "A" and User "B" are now approximately 50 meters, for example, ahead of User "C" and User "D". More specifically, in the vehicle example use case, User "C" and User "D" have exited the vehicle. Consequently, the system 100 may determine to present device 501 with the general navigation screen or the optimized navigation screen and to present device 503 with the street view screen, for example, since User "A" and User "B" will be the first to reach a particular turn relative to User "C" and User "D". In contrast, the system 100 may also determine that User "C" and User "D" are more interested in investigating their surrounding and therefore the system 100 may present devices 505 and 507 with the offers screen, the augmented and/or mixed reality screen including POIs, the media content screen, the weather en route screen, respectively. However, in the vehicle example use case, once User "C" and User "D" exit the vehicle, the system 100 disables the passenger mode associated with the devices 505 and 507 since the devices 505 and 507 are no longer paired with the driver's device 501.

In one embodiment, the system 100 can also determine at least one change in the relative positioning information of the devices (e.g., devices 501, 503, 505, and 507) as shown in FIG. 5B, and therefore cause, at least in part, a redetermination of the one or more respective user interface views based, at least in part, on the at least on change. By way of example, in this instance, the system 100 determines that User "A" and User "D" have switched positions. Consequently, the system 100 may now present the device 503 with the general navigation screen or optimized navigation screen and likewise present the device 501 with the offers screen, the augmented and/or mixed reality screen including POIs, the media content screen, or the weather en route screen. As a result, it is contemplated that system 100 can push the right information (e.g., respective user interface views) to each device (e.g., devices 501 and 507) and therefore ensure that each device displays different information to best leverage the availability of multiple screens among the group.

Figure 6:
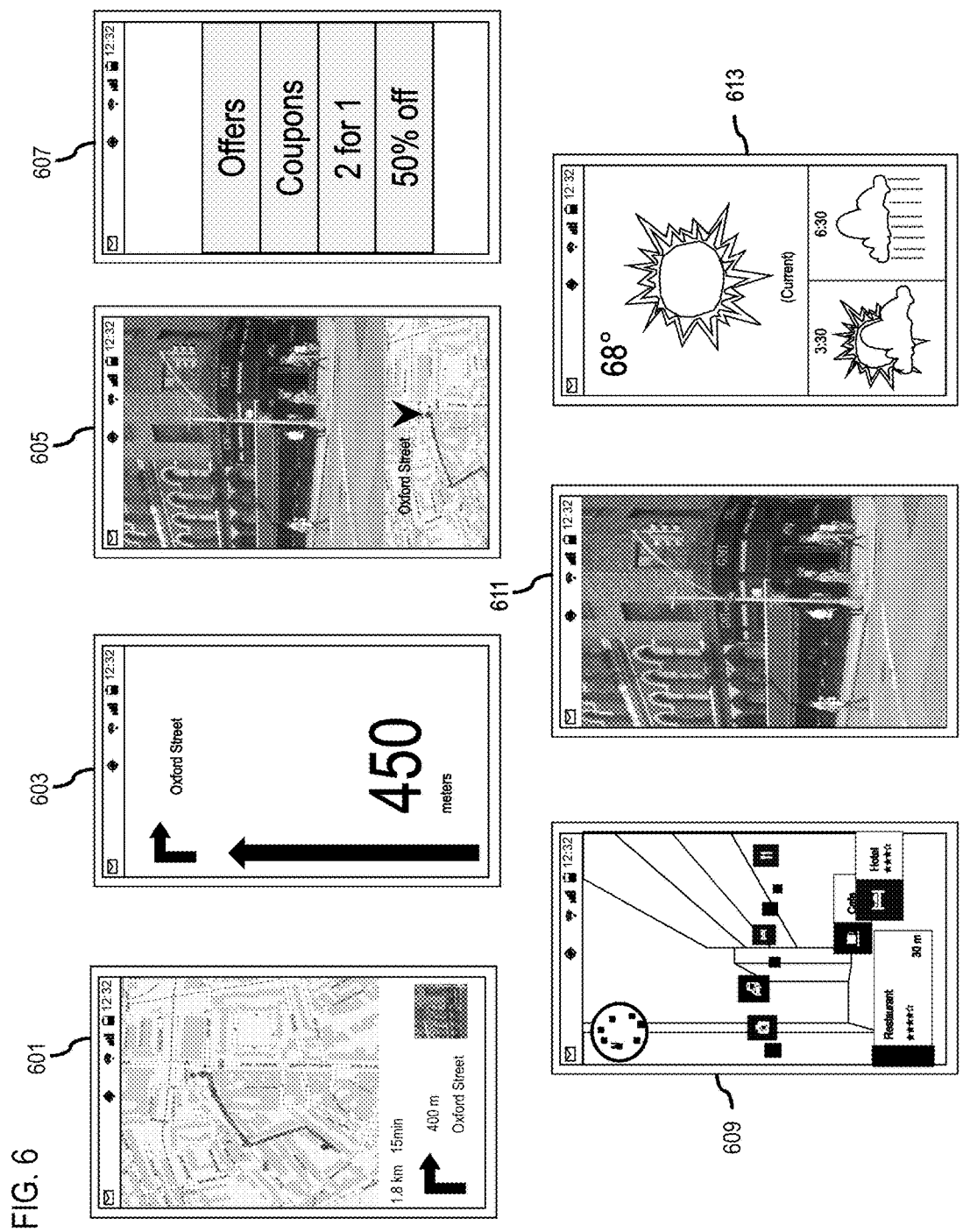
FIG. 6 is a diagram of user interfaces utilized in the processes of FIGS. 3 and 4, according to various embodiments.

FIG. 6 is a diagram of user interfaces utilized in the processes of FIGS. 3 and 4, according to various embodiments. As shown, the example user interfaces of FIG. 6 include one or more user interface elements and/or functionalities created and/or modified based, at least in part, on information, data, and/or signals resulting from the processes (e.g., processes 300 and 400) described in FIGS. 3 and 4. More specifically, FIG. 6 illustrates six user interfaces (e.g., interfaces 601, 603, 605, 607, 609, and 611. In particular, interface 601 depicts a general navigation screen (e.g., including a map, directions, distances, etc.), interface 603 depicts an optimized navigation screen (e.g., including only essential navigation elements), and interface 605 depicts a street view screen (e.g., showing an upcoming turn). In addition, interface 607 depicts an offers screen (e.g., depicting coupons associated with nearby businesses), interface 609 depicts one or more POIs associated with an augmented reality view (e.g., identifying nearby and en route restaurants, hotels, cafes, shops, transportation hubs, etc.), interface 611 depicts a media content screen (e.g., depicting images of nearby buildings, audio and/or visual tour information, etc.), and interface 613 depicts a weather en route screen (e.g., current and/or future weather details). As previously discussed, in one embodiment, the system 100 determines the one or more respective user interface views based, at least in part, on location information, device capability information, resource availability information, user input, or a combination thereof associated with the at least one device, the at least one other device, or a combination thereof. Furthermore, the system 100 determines the location information, the device capability information, the resource availability information, the user input, or a combination thereof based, at least in part, on a determining of sensor data from the at least one device, the at least one other device, or a combination thereof in a synchronized manner.

The processes described herein for providing different views of an ongoing application across multiple devices in a synchronized manner may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
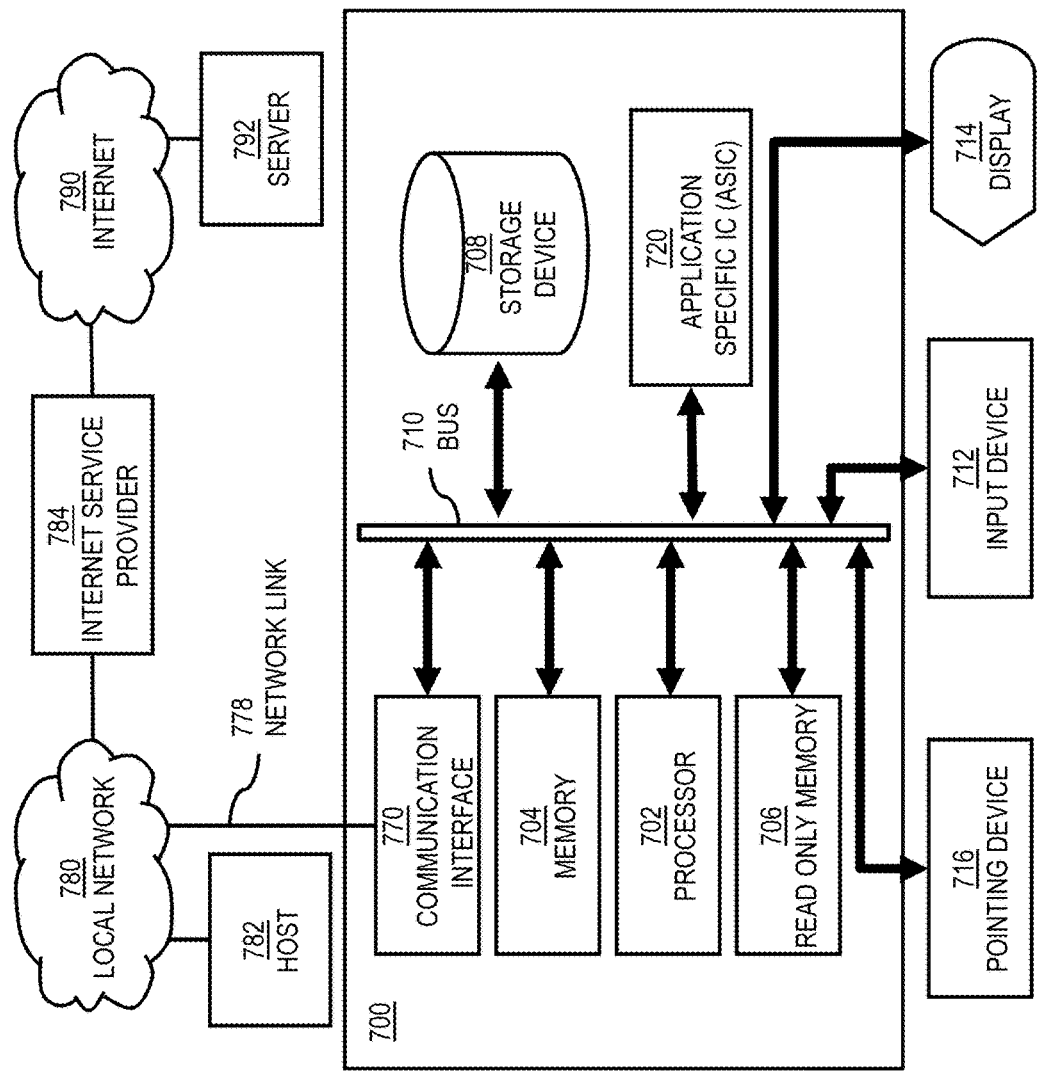
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide different views of an ongoing application across multiple devices in a synchronized manner as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing different views of an ongoing application across multiple devices in a synchronized manner.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide different views of an ongoing application across multiple devices in a synchronized manner. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing different views of an ongoing application across multiple devices in a synchronized manner. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing different views of an ongoing application across multiple devices in a synchronized manner, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing different views of an ongoing application across multiple devices in a synchronized manner to the UEs 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide different views of an ongoing application across multiple devices in a synchronized manner as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing different views of an ongoing application across multiple devices in a synchronized manner.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide different views of an ongoing application across multiple devices in a synchronized manner. The memory 805 also stores the data associated with or generated by the execution of the inventive steps.

Figure 9:
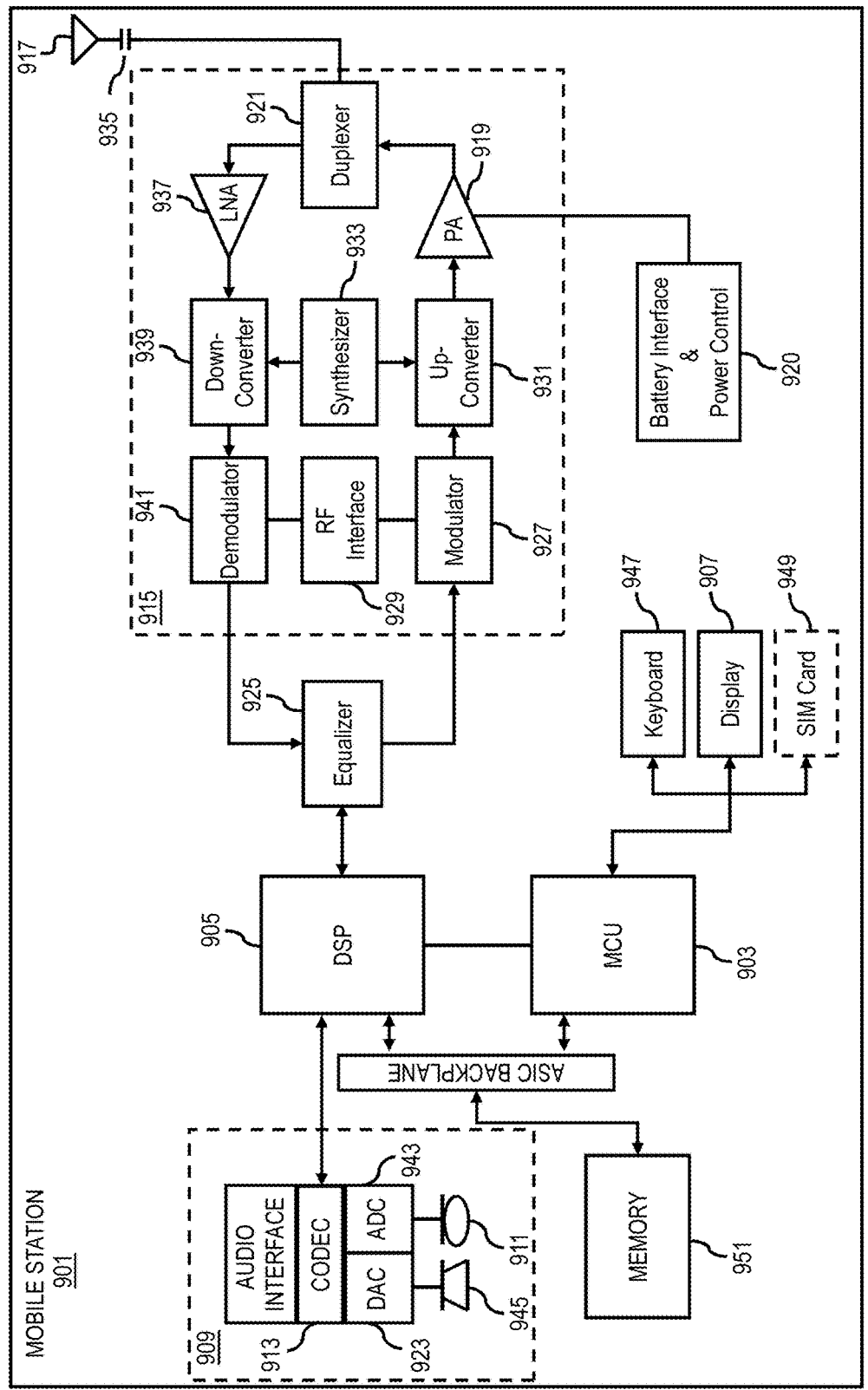
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing different views of an ongoing application across multiple devices in a synchronized manner. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing different views of an ongoing application across multiple devices in a synchronized manner. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide different views of an ongoing application across multiple devices in a synchronized manner. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for facilitating navigation using multiple synchronized mobile devices associated with a vehicle, the method comprising:

determining, utilizing at least one processor, that at least one mobile device is to be associated with a driver mode in the vehicle utilizing one or more technologies associated with the at least one mobile device, at least one other mobile device, the vehicle or a combination thereof, wherein the at least one mobile device and at least one other mobile device are user equipment that are temporarily in proximity with the vehicle and not permanently affixed as part of the vehicle;

determining that the at least one other mobile device is to be associated with a passenger mode in the vehicle utilizing at least one of the one or more technologies associated with the at least one mobile device, the at least one other mobile device, the vehicle or a combination thereof;

determining that the at least one mobile device and the at least one other mobile device are executing at least one common application configured to provide navigation information;

initiating a setting the at least one mobile device into the driver mode;

initiating a setting the at least one other mobile device into the passenger mode;

calculating a majority routing preference for the vehicle based on a majority decision of users of the at least one mobile device and the at least one other mobile device;

initiating a synchronization of data for the at least one common application among the at least one mobile device and the at least one other mobile device based on the majority routing preference and the settings of the at least one mobile device in the driver mode and the at least one other mobile device in the passenger mode; and initiating a plurality of respective user interface views configured to present at least partially different information based on the synchronized data in the driver mode on the at least one mobile device from in the passenger mode on the at least one other mobile device.

2. A method of claim 1,
wherein determining that the at least one mobile device is to be associated with the driver mode includes connecting with the at least one other mobile device and/or the vehicle via one or more short-range wireless connections and determining the respective positions of the at least one device and the at least one other device with respect to each other in the vehicle, and wherein the at least one processor is embedded in a server communicating with the at least one mobile device and the at least one other mobile device via a network.

3. A method of claim 2, wherein the driver mode and the passenger mode are determined based, at least in part, on device capability information, resource availability information, user input, or a combination thereof.

4. A method of claim 3, further comprising:
determining a request to initiate a connection of the at least one mobile device and the at least one other mobile device;

determining whether the at least one mobile device, the at least one other mobile device, or a combination thereof is within or outside of a range associated with the connection; and generating a recommendation to create or to disband a group of the at least one mobile device, the at least one other mobile device, or a combination thereof, wherein the synchronization of the data is based, at least in part, on the connection, the group, or a combination thereof.

5. A method of claim 1, further comprising:
initiating a short-range wireless communication connection of the at least one mobile device with the at least one other mobile device;

creating a group including the at least one mobile device and the at least one other mobile device based on the initiated connection;

determining a change of the at least one other mobile device into the driver position based on sensor data;

switching the respective user interface views on the at least one other mobile device based, at least in part, on the at least one change;

determining relative positioning information of the at least one device with respect to the at least one other device, wherein the driver mode for the user interface view includes, at least in part, a navigation screen, and the passenger mode for the user interface view includes a street view screen, an augmented and/or mixed reality screen, or a combination thereof; and calculating a routing preference for the vehicle based, at least in part, on routing preferences of the at least one mobile device or the at least one other mobile device, wherein the sensor data includes global positioning system data, and the determining of the modes for the respective user interface views is based, at least in part, on the relative positioning information.

6. A method of claim 5, wherein the calculated routing preference includes avoiding one or more highways with one or more toll fees, taking one or more scenic routes, or a combination thereof, wherein a respective interface view of the plurality associated with the driver mode is based at least partially on legal requirements associated with driving the vehicle, wherein a first respective user interface view of the plurality is determined for presenting through the at least one mobile device and a second respective user interface view of the plurality is determined for presenting through the at least one other mobile device, wherein the determined first and second respective user interface views are different from each other in order to leverage, based on the synchronized different views via the at least one common application, providing an understanding of the surroundings to associated users based on the availability of multiple devices in the group including the at least one mobile device and the at least one other mobile device, wherein the determined first respective user interface view is a general navigation screen or an optimized navigation screen, wherein the determined second respective user interface view is a street view screen, an offers screen, a point-of-interest selection screen, a media content screen, a weather en route screen, or a combination thereof.

7. A method of claim 1, further comprising:
determining at least one lead mobile device from among the at least one mobile device, the at least one other mobile device, or a combination thereof based, at least in part, ondevice capability information, resource availability information, user input, or a combination thereof.

8. A method of claim 1, wherein the at least one common application includes a mapping application, a location-based application, or a combination thereof, and
wherein the at least one processor is embedded in the at least one mobile device or the at least one other mobile device.

9. A method of claim 1, further comprising:
determining that the at least one mobile device is in a call with a remote device outside of the vehicle; and splitting information from the synchronization of data presented on the at least one mobile device in the call to be presented on the at least one other mobile device not in the call.

10. A method of claim 1, further comprising:
determining that the at least one mobile device has an incoming call; and forwarding the incoming call to the at least one other mobile device using one or more short-range wireless communication connections.

11. An apparatus for facilitating navigation using multiple synchronized mobile devices associated with a vehicle, the method comprising:
at least one processor; and
at least one memory including computer program code for one or more programs,
the at least one memory and the computer program code configured to, with the at least one processor, cause the apparatus to perform at least the following,
determine that at least one mobile device is to be associated with a driver mode in the vehicle utilizing one or more technologies associated with the at least one mobile device, at least one other mobile device, the vehicle or a combination thereof,
wherein the at least one mobile device and at least one other mobile device are user equipment that are temporarily in proximity with the vehicle and not permanently affixed as part of the vehicle,
determine that the at least one other mobile device is to be associated with a passenger mode in the vehicle utilizing at least one of the one or more technologies associated with the at least one mobile device, the at least one other mobile device, the vehicle or a combination thereof,
determine that the at least one mobile device and the at least one other mobile device are executing at least one common application configured to provide navigation information,
set the at least one mobile device into the driver mode,
set the at least one other mobile device into the passenger mode,
calculate a majority routing preference for the vehicle based on a majority decision of users of the at least one mobile device and the at least one other mobile device,
initiate a synchronization of data for the at least one common application among the at least one mobile device and the at least one other mobile device based on the majority routing preference and the settings of the at least one mobile device in the driver mode and the at least one other mobile device in the passenger mode, and
initiate a plurality of respective user interface views configured to present at least partially different information based on the synchronized data in the driver mode on the at least one mobile device from in the passenger mode on the at least one other mobile device.

12. An apparatus of claim 11,
wherein determining that the at least one mobile device is to be associated with the driver mode includes connecting with the at least one other mobile device and/or the vehicle via one or more short-range wireless connections and determining the respective positions of the at least one device and the at least one other device with respect to each other in the vehicle.

13. An apparatus of claim 12, wherein the driver mode and the passenger mode are determined based, at least in part, on device capability information, resource availability information, user input, or a combination thereof.

14. An apparatus of claim 13, wherein the apparatus is further caused to:

determine a request to initiate a connection of the at least one mobile device and the at least one other mobile device,
determine whether the at least one mobile device, the at least one other mobile device, or a combination thereof is within or outside of a range associated with the connection, and
generate a recommendation to create or to disband a group of the at least one mobile device, the at least one other mobile device, or a combination thereof,
wherein the synchronization of the data is based, at least in part, on the connection, the group, or a combination thereof.

15. An apparatus of claim 11, wherein the apparatus is further caused to:
initiate a short-range wireless communication connection of the at least one mobile device with the at least one other mobile device,
create a group including the at least one mobile device and the at least one other mobile device based on the initiated connection,
determine a change of the at least one other mobile device into the driver position based on sensor data,
switch the respective user interface views on the at least one other mobile device based, at least in part, on the at least one change,
determine relative positioning information of the at least one device with respect to the at least one other device,
wherein the driver mode for the user interface view includes, at least in part, a navigation screen, and the passenger mode for the user interface view includes a street view screen, an augmented and/or mixed reality screen, or a combination thereof, and
calculating a routing preference for the vehicle based, at least in part, on routing preferences of the at least one mobile device or the at least one other mobile device,
wherein the sensor data includes global positioning system data, and the determining of the modes for the respective user interface views is based, at least in part, on the relative positioning information.

16. An apparatus of claim 15, wherein the calculated routing preference includes avoiding one or more highways with one or more toll fees, taking one or more scenic routes, or a combination thereof,
wherein a respective interface view of the plurality associated with the driver mode is based at least partially on legal requirements associated with driving the vehicle,
wherein a first respective user interface view of the plurality is determined for presenting through the at least one mobile device and a second respective user interface view of the plurality is determined for presenting through the at least one other mobile device,
wherein the determined first and second respective user interface views are different from each other in order to leverage, based on the synchronized different views via the at least one common application, providing an understanding of the surroundings to associated users based on the availability of multiple devices in the group including the at least one mobile device and the at least one other mobile device,
wherein the determined first respective user interface view is a general navigation screen or an optimized navigation screen,
wherein the determined second respective user interface view is a street view screen, an offers screen, a point-of-interest selection screen, a media content screen, a weather en route screen, or a combination thereof.

17. An apparatus of claim 11, wherein the apparatus is further caused to:
- determine at least one lead mobile device from among the at least one mobile device, the at least one other mobile device, or a combination thereof based, at least in part, on device capability information, resource availability information, user input, or a combination thereof.

18. An apparatus of claim 11, wherein the at least one common application includes a mapping application, a location-based application, or a combination thereof.

19. An apparatus of claim 18, wherein the apparatus is further caused to:
- determine that the at least one mobile device has an incoming call; and
- forward the incoming call to the at least one other mobile device using one or more short-range wireless communication connections.

20. An apparatus of claim 11, wherein the apparatus is further caused to:
- determine that the at least one mobile device is in a call with a remote device outside of the vehicle; and
- split information from the synchronization of data presented on the at least one mobile device in the call to be presented on the at least one other mobile device not in the call.

* * * * *